United States Patent
Honda et al.

(10) Patent No.: US 9,515,763 B2
(45) Date of Patent: Dec. 6, 2016

(54) DIGITAL COHERENT RECEIVER AND RECEIVING METHOD OF OPTICAL SIGNAL

(71) Applicant: FUJITSU LIMITED, Kawasaki-shi, Kanagawa (JP)

(72) Inventors: Toshiki Honda, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/661,445

(22) Filed: Mar. 18, 2015

(65) Prior Publication Data
US 2015/0288458 A1  Oct. 8, 2015

(30) Foreign Application Priority Data
Apr. 7, 2014  (JP) .................................. 2014-078779

(51) Int. Cl.
| H04B 10/61 | (2013.01) |
| H04J 14/02 | (2006.01) |
| H04B 10/06 | (2006.01) |
| H04B 10/27 | (2013.01) |

(52) U.S. Cl.
CPC .............. *H04J 14/02* (2013.01); *H04B 10/27* (2013.01); *H04B 10/6161* (2013.01); *H04B 10/6163* (2013.01)

(58) Field of Classification Search
CPC ... H04J 14/02; H04B 10/6161; H04B 10/6163
USPC .................................................... 398/79, 81
See application file for complete search history.

(56) References Cited

U.S. PATENT DOCUMENTS

| 7,769,305 | B1* | 8/2010 | Roberts | ................. | H04B 10/60 398/152 |
| 2009/0245809 | A1 | 10/2009 | Nakamoto | | |
| 2010/0278528 | A1 | 11/2010 | Isomura et al. | | |
| 2011/0255879 | A1* | 10/2011 | Xie | .................... | H04B 10/2513 398/208 |
| 2011/0260918 | A1* | 10/2011 | Nguyen | ............... | H04B 7/0617 342/368 |

(Continued)

FOREIGN PATENT DOCUMENTS

| JP | 2008-054219 | 3/2008 |
| JP | 2009-239555 | 10/2009 |

(Continued)

*Primary Examiner* — Oommen Jacob
(74) *Attorney, Agent, or Firm* — Fujitsu Patent Center

(57) ABSTRACT

A digital coherent receiver that receives a first optical signal in a WDM optical signal includes: a front-end circuit configured to generate a digital signal indicating the first optical signal; a waveform distortion corrector configured to generate a correction result signal indicating a first optical signal whose waveform distortion has been corrected by performing a digital arithmetic operation on the digital signal using at least one dispersion compensators and at least one nonlinear compensators; and a controller configured to adjust operation states of specified dispersion compensators among the plurality of dispersion compensators and specified nonlinear compensators among the plurality of nonlinear compensators. The number of the specified dispersion compensators and the number of the specified nonlinear compensators are determined based on the number of spans of an optical transmission line through which the first optical signal is transmitted.

12 Claims, 15 Drawing Sheets

(56) References Cited

U.S. PATENT DOCUMENTS

| | | | |
|---|---|---|---|
| 2011/0318019 A1* | 12/2011 | Nissov | H04B 10/2513 398/159 |
| 2012/0027418 A1* | 2/2012 | Secondini | H04L 25/03133 398/158 |
| 2012/0290244 A1* | 11/2012 | Yan | H04B 10/6971 702/86 |
| 2014/0093255 A1* | 4/2014 | Liu | H04B 10/6161 398/208 |
| 2015/0063818 A1* | 3/2015 | Zhou | H04B 10/516 398/115 |
| 2015/0288458 A1* | 10/2015 | Honda | H04J 14/02 398/81 |

FOREIGN PATENT DOCUMENTS

| | | |
|---|---|---|
| WO | 2009-060526 | 5/2009 |
| WO | 2009-144997 | 12/2009 |

* cited by examiner

| RECEIVER | OPTICAL SIGNAL | CDC#1 | NLE#1 | CDC#2 | NLE#2 | ... | CDC#N | NLE#N | NUMBER OF SPANS | SOURCE |
|---|---|---|---|---|---|---|---|---|---|---|
| #1 | λ1 | 50 | 0.3 0.05 | -70 | 0.2 0.02 | | 20 | 0.3 0.04 | 5 | NODE 1 |
| #2 | λ2 | -30 | 0.3 0.05 | 60 | 0.2 0.02 | | 150 | 0.7 0.01 | 7 | NODE 15 |
| ... | | | | | | | | | | |
| #m | λ80 | 50 | 0.3 0.05 | -70 | 0.2 0.02 | | 20 | 0.3 0.04 | 5 | NODE 1 |

13

F I G. 6

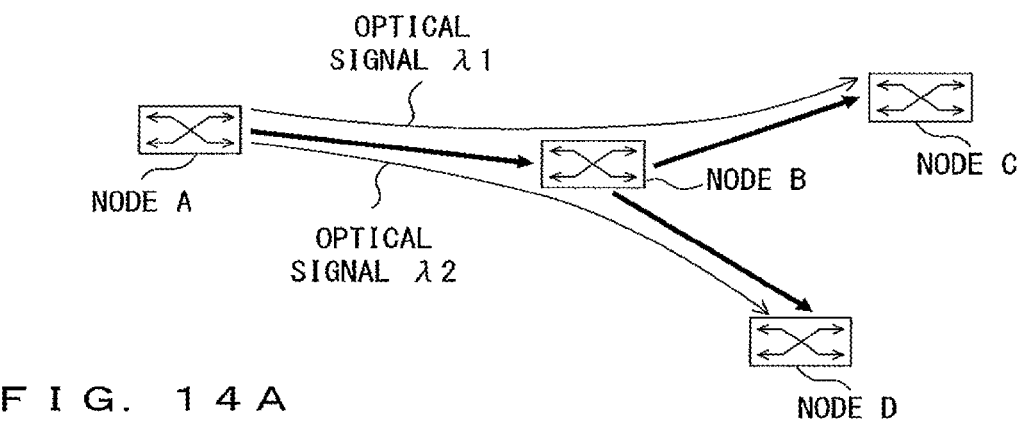
F I G. 1 4 A
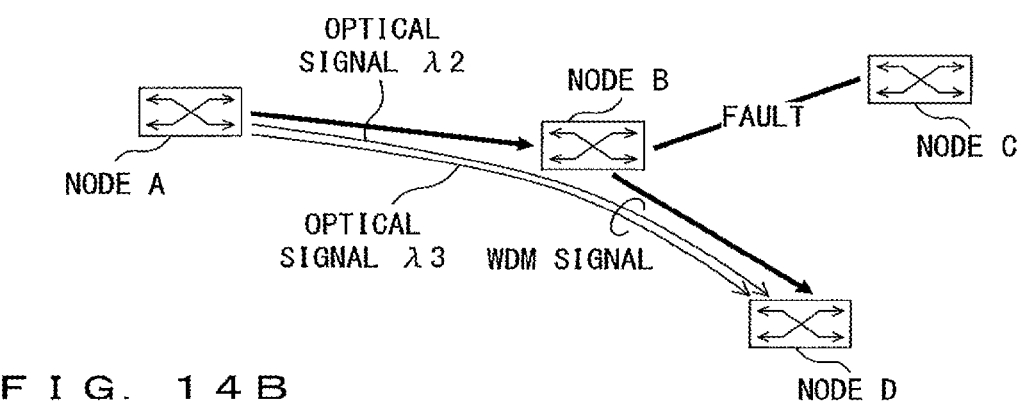
F I G. 1 4 B

DIGITAL COHERENT RECEIVER AND RECEIVING METHOD OF OPTICAL SIGNAL

CROSS-REFERENCE TO RELATED APPLICATION

This application is based upon and claims the benefit of priority of the prior Japanese Patent Application No. 2014-078779, filed on Apr. 7, 2014, the entire contents of which are incorporated herein by reference.

FIELD

The embodiments discussed herein are related to a digital coherent receiver and a method of receiving an optical signal.

BACKGROUND

With the spread of a high-speed mobile communication service, a cloud service, a video distribution service, etc., the amount of traffic over a network has greatly increased. Therefore, a high-speed interface of 100 Gbps per wavelength is requested for a transmission device on a backbone circuit of a network. Furthermore, the study and the development of a technique of realizing 400 Gbps through 1 Tbps have been performed.

Digital coherent detection has recently attracted attention as one of the techniques for transmitting an optical signal exceeding 100 Gbps. A digital coherent receiver recovers optical intensity information and phase information from received light by coherent detection. The recovered optical intensity information and phase information are digitalized by an A/D converter, and demodulated by a digital signal processing circuit. The digital signal processing circuit is realized by, for example, a DSP (digital signal processor).

The waveform of an optical signal is distorted on an optical transmission line. That is, a waveform distortion occurs on the optical transmission line. The waveform distortion is caused by the dispersion (for example, chromatic dispersion) of an optical transmission line. The waveform distortion includes a nonlinear distortion caused on the optical transmission line. When a waveform of an optical signal is degraded, there is the possibility of increasing an error rate of recovered data.

Therefore, a digital signal processing circuit of a digital coherent receiver may have a function of correcting the waveform distortion of an optical signal. In this case, a waveform distortion correction circuit includes a plurality of dispersion compensators and a plurality of nonlinear compensators. The plurality of dispersion compensators and the plurality of nonlinear compensators are alternately connected. That is, the dispersion compensating process and the nonlinear compensating process are alternately performed on a received optical signal. A set of dispersion compensator and nonlinear compensator may be referred to as a "stage". If the number of stages increases, the compensation accuracy becomes higher.

A waveform distortion correction is performed using, for example, a training signal. In this case, a transmitter adds the training signal to a data signal. The data pattern of the training signal is known. Then, in a receiver (that is, a digital coherent receiver), the waveform distortion correction circuit performs the waveform distortion correction on the training signal. In this case, the parameters of the dispersion compensator and the nonlinear compensator are adjusted until the training signal is detected. When the training signal is detected, it is considered that the parameters of the dispersion compensator and the nonlinear compensator have been adjusted to the status close to the optimum values. Then, by finely adjusting the parameters of the dispersion compensator and the nonlinear compensator, the waveform distortion correction circuit is controlled into an appropriate operation state.

An optical transceiver having an electronic dispersion compensation circuit has been proposed as a related technique (for example, Japanese Laid-open Patent Publication No. 2008-54219). Also, an optical transmission system which efficiently improves the waveform distortion of an optical signal has been proposed (for example, Japanese Laid-open Patent Publication No. 2009-239555). Furthermore, a coherent optical receiver which may control tap coefficients of a digital filter and has a short tap coefficient setting time without using a chromatic dispersion measuring instrument has been proposed (for example, WO2009/060526). Furthermore, a device which detects the polarization dispersion and the chromatic dispersion of an optical signal has been proposed (for example, WO2009/144997).

As described above, a digital coherent receiver may correct the waveform distortion of an optical signal using a training signal added to a data signal in a transmitter. However, with the configuration in which a training signal is used, it is necessary to provide a circuit for processing a training signal in addition to a circuit for processing a data signal, thereby increasing the scale of a digital signal processing circuit. In addition, since a training signal is transmitted in addition to the data signal, it is necessary to increase a transmission rate of an optical signal. Thus, the higher the speed of an optical device, the more the cost increases. Furthermore, with an increasing speed of the optical signal, the transmission characteristic becomes easily degraded.

The problem may be solves by, for example, adjusting the parameter of a waveform distortion correction circuit by blind equalization without a training signal. However, in the blind equalization, the digital coherent receiver does not know the data pattern of a transmission signal. Therefore, it may take a long time to converge the parameter of the waveform distortion correction circuit, or a parameter of the waveform distortion correction circuit does not converge.

The adjustment of the parameter of the waveform distortion correction circuit is performed not only at the start of a communication service but also when an optical path is switched by a fault etc. Therefore, the adjustment of the parameter of the waveform distortion correction circuit is to be completed in a short time.

SUMMARY

According to an aspect of the embodiments, a digital coherent receiver receives a first optical signal in a wavelength division multiplexed optical signal in an optical transmission device that transmits the wavelength division multiplexed optical signal. The digital coherent receiver includes: a front-end circuit configured to generate a digital signal indicating the first optical signal; a waveform distortion corrector configured to include a plurality of dispersion compensators and a plurality of nonlinear compensators and generate a correction result signal indicating a first optical signal whose waveform distortion has been corrected by performing a digital arithmetic operation on the digital signal using at least one of the plurality of dispersion compensators and at least one of the plurality of nonlinear compensators; and a controller configured to adjust operation states of specified dispersion compensators among the plurality of dispersion compensators and specified nonlinear compensators among the plurality of nonlinear compensators, wherein the number of the specified dispersion compensators and the number of the specified nonlinear compensators are determined based on the number of spans of an optical transmission line through which the first optical signal is transmitted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a parameter database;

FIGS. 14A and 14B are explanatory views of an operation performed when an optical path is switched.

DESCRIPTION OF EMBODIMENTS

Figure 1:
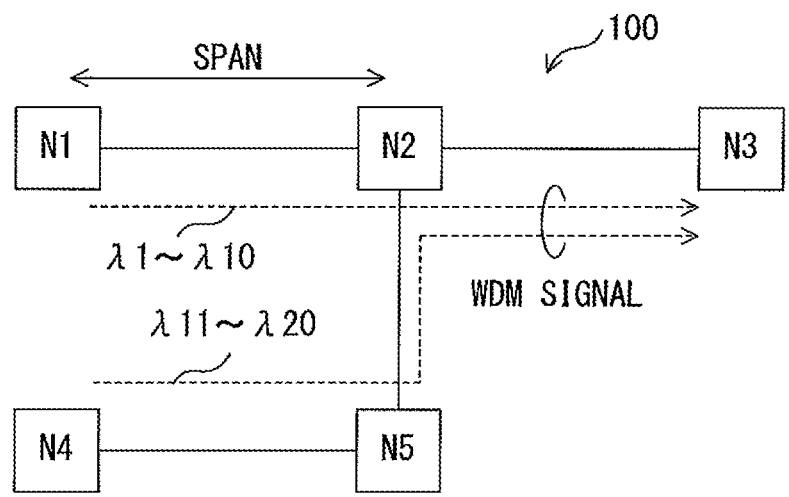
FIG. 1 illustrates an example of an optical transmission system according to an embodiment of the present invention.

FIG. 1 illustrates an example of an optical transmission system according to an embodiment of the present invention. An optical transmission system 100 according to the present embodiment includes a plurality of optical transmission devices. In the example illustrated in FIG. 1, an optical transmission device is provided in each of nodes N1 through N5. In the following descriptions, the optical transmission devices provided in the nodes N1 through N5 may be respectively referred to as optical transmission devices N1 through N5. That is, the optical transmission system 100 includes the optical transmission devices N1 through N5. Each of the optical transmission devices N1 through N5 can transmit a wavelength division multiplexed signal (WDM). That is, each of the optical transmission devices N1 through N5 is a WDM transmission device. Note that each of the optical transmission devices N1 through N5 includes a transmitter module which transmits an optical signal and a receiver module which receives an optical signal.

Figure 2:
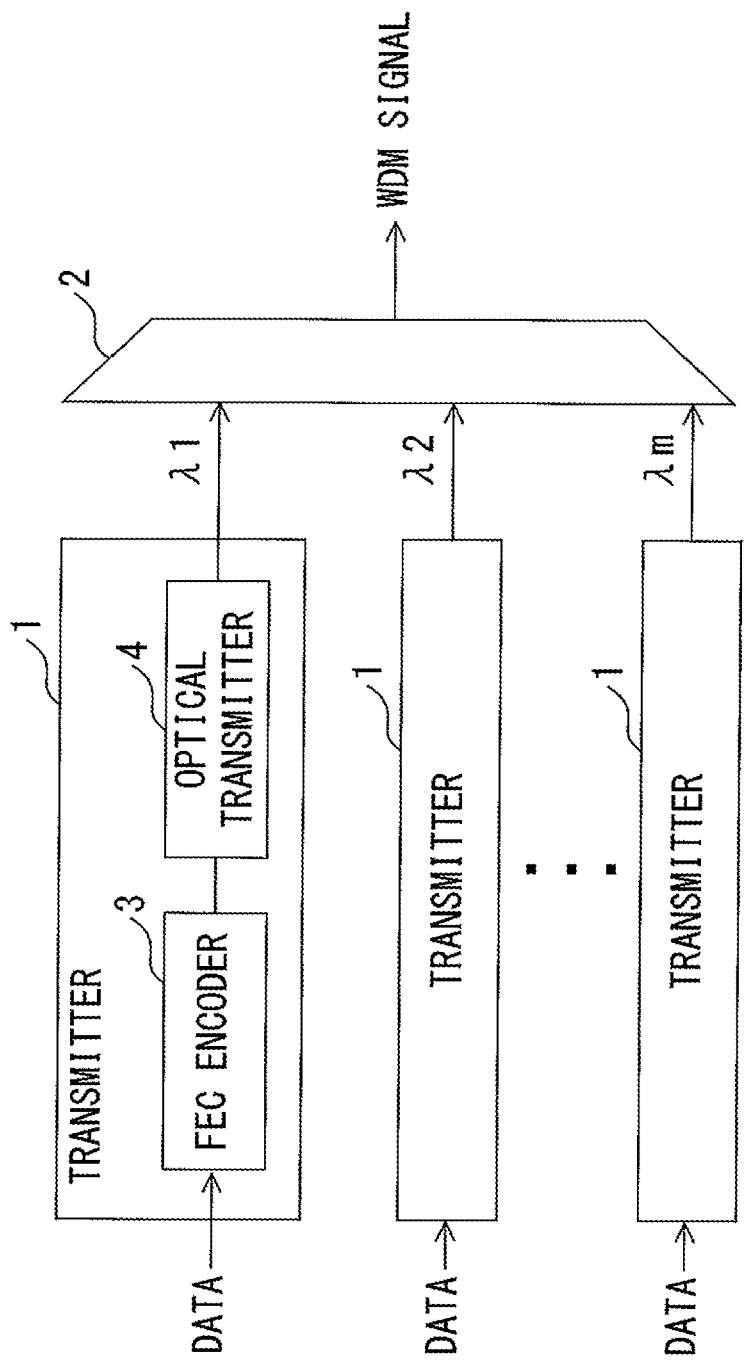
FIG. 2 illustrates an example of a transmitter module implemented in an optical transmission device.

The transmitter module includes a plurality of transmitters 1 and a multiplexer 2 as illustrated in FIG. 2. Each transmitter 1 includes an FEC encoder 3 and an optical transmitter 4. The FEC encoder 3 generates encoded data by an FEC process on transmission data. In this case, the FEC encoder 3 adds an FEC code to the transmission data. The optical transmitter 4 generates an optical signal for transmitting the encoded data. The optical transmitter 4 includes, for example, a laser light source and an optical modulator. In this case, the optical transmitter 4 generates a modulated optical signal. The transmitter 1 may generate a polarization multiplexed optical signal.

The wavelengths of a plurality of optical signals generated by the plurality of transmitters 1 are different from one another. The multiplexer 2 generates a WDM optical signal by multiplexing the plurality of optical signals generated by the plurality of transmitter 1.

However, the transmitter module does not have to include the multiplexer 2. For example, when an optical transmission device includes an optical add-drop multiplexer (OADM), an optical signal generated by each transmitter 1 may be input to the OADM. In this case, the OADM selects one or more specified optical signals. Then, the optical signal selected by the OADM is multiplexed on the WDM optical signal and transmitted.

Figure 3:
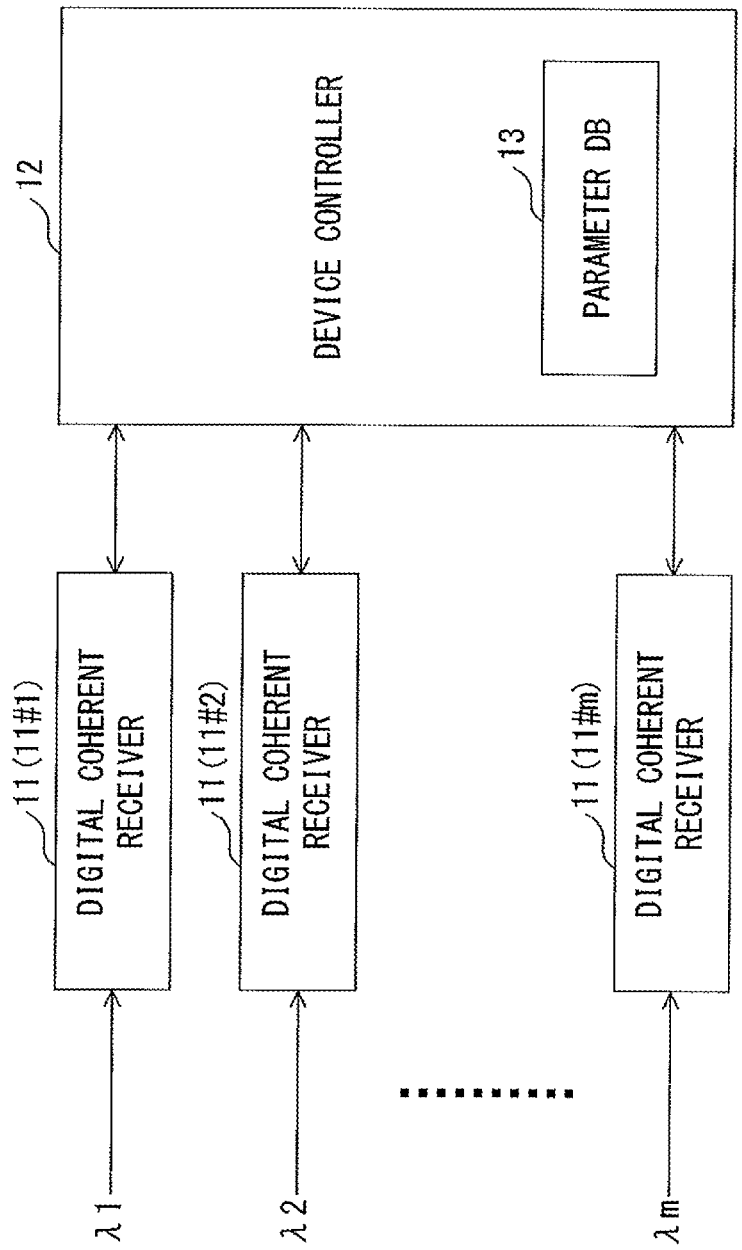
FIG. 3 illustrates an example of a receiver module implemented in an optical transmission device.

The receiver module includes a plurality of digital coherent receivers 11 (11#1 through 11#m) and a device controller 12 as illustrated in FIG. 3. In the example illustrated in FIG. 3, a plurality of optical signals $\lambda 1$-$\lambda m$ are generated by demultiplexing a received WDM optical signal. The optical signals $\lambda 1$-$\lambda m$ are respectively guided to the digital coherent receivers 11#1 through 11#m. Each digital coherent receiver 11 recovers transmission data from an input optical signal. The device controller 12 manages the state of the digital coherent receivers 11#1 through 11#m, and controls the operation of the digital coherent receivers 11#1 through 11#m. The device controller 12 also includes a parameter database 13. The parameter database 13 is described later.

The optical transmission system 100 may provide a specified optical path. The optical path is established by, for example, a network management system not illustrated in the attached drawings according to a request from a user. In the example illustrated in FIG. 1, optical paths $\lambda 1$-$\lambda 10$ for transmitting data from the node N1 to the node N3 through the node N2 are established. Also, optical paths $\lambda 11$-$\lambda 20$ for transmitting data from the node N4 to the node N3 through the node N5 and the node N2 are established. The optical paths $\lambda 1$-$\lambda 20$ respectively transmit the optical signals $\lambda 1$-$\lambda 20$.

In the following descriptions, a connection or an optical transmission line between adjacent nodes may be referred to as a "span". Also, the number of spans on the optical transmission line between any two nodes may be referred to as the "number of spans". For example, in FIG. 1, the number of spans of the optical path $\lambda 1$ (optical transmission line of the optical signal $\lambda 1$) is 2. The number of spans of the optical path $\lambda 11$ (optical transmission line of the optical signal $\lambda 11$) is 3.

Figure 4:
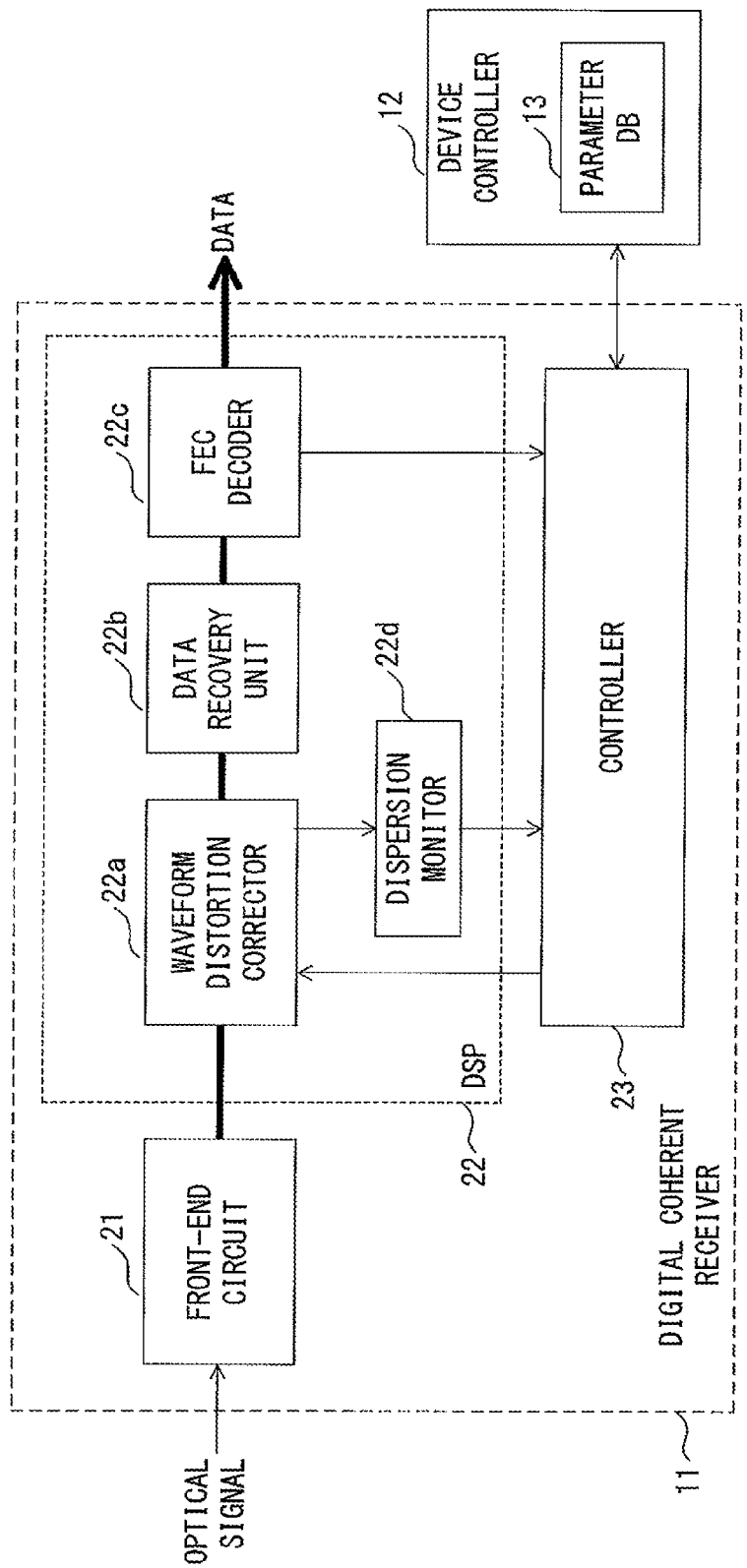
FIG. 4 illustrates an example of a configuration of a digital coherent receiver.

FIG. 4 illustrates an example of the configuration of the digital coherent receiver 11. As illustrated in FIG. 4, the digital coherent receiver 11 includes a front-end circuit 21, a DSP 22, and a controller 23. Furthermore, one optical signal extracted from a received WDM optical signal is input to the digital coherent receiver 11 as explained above with reference to FIG. 3. The optical signal is guided to the front-end circuit 21.

The front-end circuit 21 generates a digital signal indicating an input optical signal by the coherent detection. The digital signal includes the optical intensity information and the phase information about the input optical signal. That is, the digital signal indicates the I component and the Q component of the input optical signal. When a polarization multiplexed optical signal is input, the digital signal indicates the I component and the Q component of the H polarization, and the I component and the Q component of the V polarization. The front-end circuit 21 includes, for example, a local light source, a 90 degree optical hybrid circuit, a photo detector circuit, an A/D conversion circuit, etc.

The digital signal processor (DSP) 22 includes a waveform distortion corrector 22a, a data recovery unit 22b, an FEC decoder 22c, and a dispersion monitor 22d. The DSP 22 demodulates the digital signal generated by the front-end circuit 21, and recovers the transmission data. The DSP 22 is an example of a digital signal processing circuit. The DSP 22 may also have other functions.

The waveform distortion corrector 22a generates a correction result signal that indicates an optical signal whose waveform distortion has been corrected by performing a digital arithmetic operation on a digital signal output from the front-end circuit 21 (that is, a digital signal indicating an input optical signal). The data recovery unit 22b recovers data from the correction result signal output from the waveform distortion corrector 22a. In this case, the data recovery unit 22b recovers data of the number of bits corresponding to a modulating format for each symbol. Furthermore, the data recovered by the data recovery unit 22b corresponds to the encoded data generated by the FEC encoder 3 illustrated in FIG. 2.

The FEC decoder 22c detects an error in the recovered data by performing an FEC process on the data recovered by the data recovery unit 22b. When the recovered data includes an error, the FEC decoder 22c corrects the error. In this case, the FEC decoder 22c counts the number of error corrections and notifies the controller 23 of the count result. The number of error corrections indicates the number of errors corrected by the FEC process per unit time. Thus, an error rate may be reported to the controller 23. The dispersion monitor 22d calculates the residual dispersion of an optical signal whose waveform distortion has been corrected based on the correction result signal output from the waveform distortion corrector 22a. Then, the dispersion monitor 22d notifies the controller 23 of the calculated residual dispersion.

The controller 23 controls the waveform distortion corrector 22a based on the residual dispersion calculated by the dispersion monitor 22d and the number of error corrections counted by the FEC decoder 22c. Practically, the controller 23 adjusts the parameter used in a digital arithmetic operation by the waveform distortion corrector 22a. Note that the controller 23 may acquire the initial value of the parameter to be given to the waveform distortion corrector 22a from the parameter database 13 of the device controller 12. Then the controller 23 adjusts (or optimizes) the parameter given to the waveform distortion corrector 22a based on the residual dispersion calculated by the dispersion monitor 22d and the number of error corrections counted by the FEC decoder 22c.

Next, the configuration and the operation of the waveform distortion corrector 22a are described. In this example, the waveform distortion corrector 22a corrects the waveform distortion by an inverse propagation nonlinear compensation.

The signal which propagates in an optical fiber is expressed by the following nonlinear Schroedinger's equation $$\frac{\partial E}{\partial z} = (\hat{D} + \hat{N})E$$

$$\hat{D} = -i\frac{\beta_2}{2}\frac{\partial^2}{\partial t^2} - \frac{\alpha}{2}$$

$$\hat{N} = i\gamma|E|^2$$

D indicates a linear operator. N indicates a nonlinear operator. α indicates a loss (or attenuation) in an optical fiber. $\beta_2$ indicates the chromatic dispersion coefficient of the optical fiber. γ indicates the nonlinear coefficient of the optical fiber.

When noise is ignored, a signal at a transmission end is calculated by inversely solving the above-mentioned nonlinear Schroedinger's equation from a reception end. The inverse arithmetic operation of the nonlinear Schroedinger's equation is approximated by an arithmetic operation of alternately repeating the linear compensation (that is, the chromatic dispersion compensation) and the nonlinear compensation (that is, the self phase modulation compensation). Especially, when the number of times of the repetition is large, the inverse arithmetic operation of the nonlinear Schroedinger's equation is equivalent to the operation of alternately repeating the linear compensation and the nonlinear compensation. The above-mentioned arithmetic operation is described in the following Documents 1 and 2.
Document 1: Ezra Ip et al., "Compensation of Dispersion and Nonlinear Impairments Using Backpropagation", Journal of Lightwave Technology, Vol. 26, pp 3416-3425, 2008
Document 2: T. Tanimura, T. Hoshida, S. Oda, T. Tanaka, H. Nakajima, et al., "Semi-blind Multi-Stage Dual-Polarization Nonlinear Compensation in 112 Gb/s DP-QPSK Coherent Receiver" The Institute of Electronics, Information and Communication Engineers Technical Report OCS, Optical Communication System 110 (152), 57-62, 2010-07-22

Figure 5:
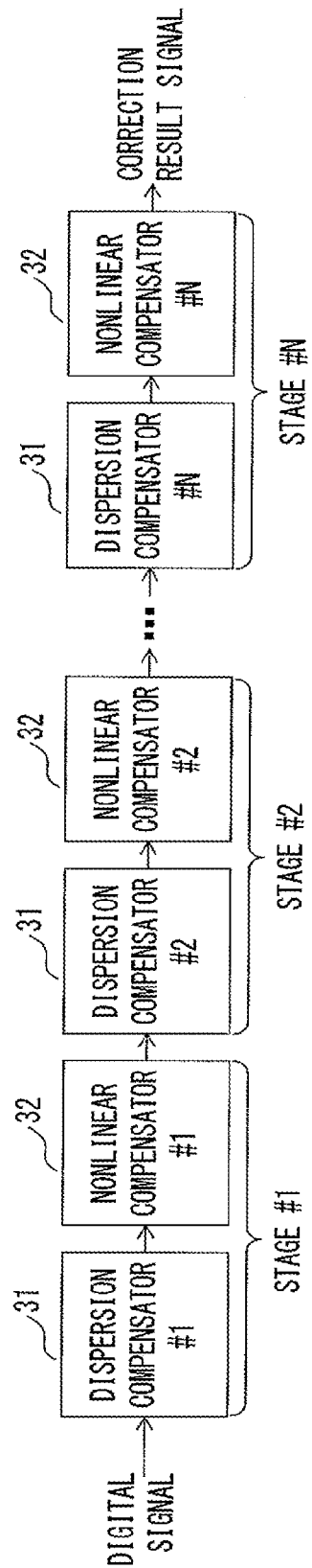
FIG. 5 illustrates an example of a configuration of a waveform distortion corrector.

Therefore, as illustrated in FIG. 5, the waveform distortion corrector 22a includes a plurality of dispersion compensators 31 (#1 through #N) and a plurality of nonlinear compensators 32 (#1 through #N). The plurality of dispersion compensators 31 and the plurality of nonlinear compensators 32 are connected alternately. That is, a digital signal generated by the front-end circuit 21 is processed alternately by the dispersion compensator 31 and the nonlinear compensator 32. As a result, a correction result signal is generated. The correction result signal indicates an input optical signal whose waveform distortion has been corrected.

However, the waveform distortion corrector 22a is not to use all dispersion compensators 31 and nonlinear compensators 32. That is, the waveform distortion corrector 22a may process a digital signal using a part of the dispersion compensators 31 (#1 through #N) and a part of a plurality of nonlinear compensators 32 (#1 through #N).

In the following descriptions, a set of the dispersion compensator 31 and the nonlinear compensator 32 may be referred to as a "stage". For example, a stage #1 is configured by a dispersion compensator 31#1 and a nonlinear compensator 32#1, and a stage #2 is configured by a dispersion compensator 31#2 and a nonlinear compensator 32#2.

The dispersion compensator 31 compensates for chromatic dispersion. In this example, the dispersion compensator 31 is realized by a digital filter (for example an FIR filter). In this case, each filter coefficient of the digital filter is uniquely calculated from an amount of dispersion to be compensated. Therefore, when an amount of dispersion to be compensated is assigned in each stage, each filter coefficient of the dispersion compensator 31 of each stage is determined.

The nonlinear compensator 32 compensates for the nonlinear effect of an optical transmission line. In this embodiment, the nonlinear compensator 32 is realized by a digital filter (for example, an FIR filter). In this case, each filter coefficient of the digital filter is calculated according to, for example, two parameters $\gamma$ and $\alpha$. $\gamma$ indicates the intensity of a nonlinear correction. Furthermore, $\alpha$ indicates the shape of a filter (shape of an impulse response waveform). Therefore, when the parameters $\gamma$ and $\alpha$ are assigned, each filter coefficient of the nonlinear compensator 32 is determined.

FIG. 6 illustrates an example of the parameter database 13. The parameter database 13 stores parameters to be used for dispersion compensation and nonlinear compensation in each digital coherent receiver 11. The parameter database 13 is provided in the device controller 12 as described above.

A "receiver" identifies a plurality of digital coherent receivers 11 provided in the optical transmission device. For example, #1 indicates the digital coherent receiver 11#1. An "optical signal" identifies the optical signal received by a corresponding digital coherent receiver 11. In the example illustrated in FIG. 6, the digital coherent receiver 11#1 receives a optical signal $\lambda 1$.

The "CDC#1" through "CDC#N" indicate the amount of dispersion compensated by each stage. The filter coefficient of the dispersion compensator 31 of each stage is uniquely calculated for the amount of dispersion. For example, the amount of dispersion to be compensated in the stage #1 for the optical signal $\lambda 1$ is 50 ps/nm. In this case, in the digital coherent receiver 11#1, the filter coefficient of the dispersion compensator 31 of the stage #1 is calculated to realize 50 ps/nm.

The "NLE#1" through "NLE#N" indicate the parameters $\gamma$ and $\alpha$ corresponding to the nonlinear effect compensated by the nonlinear compensator 32 of each stage. The value in the upper row indicates $\gamma$, and the value in the lower row indicates $\alpha$. The filter coefficient of the nonlinear compensator 32 of each stage is uniquely calculated for the combination of $\gamma$ and $\alpha$. For example, the nonlinear effects to be compensated in the stage #1 for the optical signal $\lambda 1$ are $\gamma=0.3$ and $\alpha=0.05$. In this case, in the digital coherent receiver 11#1, the filter coefficient of the nonlinear compensator 32 of the stage #1 is calculated based on $\gamma=0.3$ and $\alpha=0.05$.

The "number of spans" indicates the number of spans of the optical transmission line through which an optical signal is transmitted. In the example illustrated in FIG. 6, the number of spans of the optical signal $\lambda 1$ is 5. The "source" identifies the source node of an optical signal. In the example illustrated in FIG. 6, the source of the optical signal $\lambda 1$ is the node 1.

The parameter database 13 is updated when a new optical path is established. That is, when a new optical path is established, a record corresponding to the new optical path is added to the parameter database 13. In this case, the source and the number of spans of the optical signal is given by, for example, a network management system which manages the optical transmission system.

Each of the parameters (CDC#1 through CDC#N, NLE#1 through NLE#N) is received from a corresponding digital coherent receiver 11. That is, the digital coherent receiver 11 adjusts or optimizes the parameters of each stage when a new optical path is accommodated. Then, the digital coherent receiver 11 notifies the device controller 12 of adjusted or optimized parameters of each stage. Then, the device controller 12 stores the parameters notified from the digital coherent receiver 11 in the parameter database 13.

In the example illustrated in FIG. 6, the parameter of the dispersion compensator 31 is expressed as an amount of dispersion, and the parameters of the nonlinear compensator 32 are expressed by $\gamma$ and $\alpha$. However, the present invention is not limited to the configuration. That is, calculated filter coefficients may be stored in the parameter database 13.

Next, the operation of the digital coherent receiver 11 when a new optical path is setup or when an optical path is switched is described below. When a new optical path is setup, or when an optical path is switched, the digital coherent receiver 11 adjusts the parameters of the waveform distortion corrector 22a. Some embodiments are described below.

<First Embodiment>

In the WDM transmission system, a plurality of optical signals with different wavelengths may be transmitted through an optical fiber. In the example illustrated in FIG. 1, the optical signals $\lambda 1$-$\lambda 10$ multiplexed in a WDM optical signal are transmitted from the node N1 to the node N3 through the same optical fiber transmission line.

Figure 7:
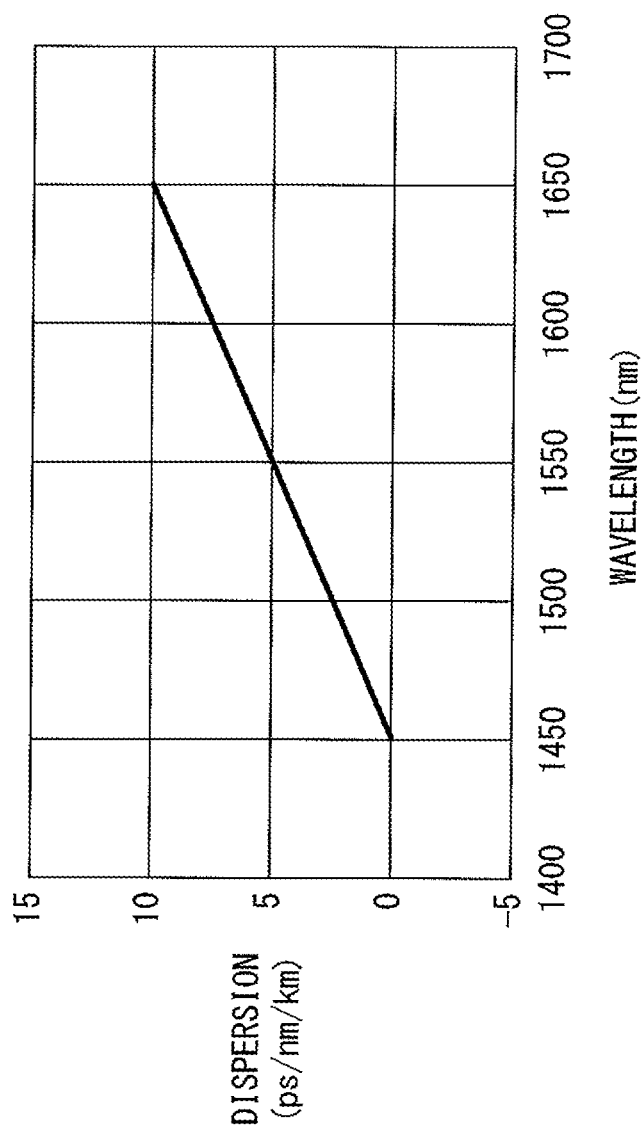
FIG. 7 illustrates an example of the dispersion characteristic of an optical fiber.

The chromatic dispersion which occurs in an optical fiber transmission depends on the wavelength of an optical signal as illustrated in FIG. 7. FIG. 7 illustrates an example of the dispersion characteristic of a single mode fiber. The amount of dispersion is substantially in proportion to a wavelength. That is, when optical signals A and B with different wavelengths are transmitted through the same optical transmission line, there is a close relationship between the amount of dispersion of the optical signal A and the amount of dispersion of the optical signal B.

On the other hand, the nonlinear effect depends on the state of an optical fiber, the input power of an optical signal, etc. However, the nonlinear effect hardly depends on the wavelength of an optical signal. Therefore, assuming that the power of the optical signals A and B is the same when the optical signals A and B with different wavelengths are transmitted through the same optical transmission line, the nonlinear effect of the optical signal A is approximately the same as or close to the nonlinear effect of the optical signal B. Note that the power of a plurality of optical signals multiplexed in a WDM optical signal is equalized in many cases.

With the above-mentioned characteristics taken into account, when the optical signals A and B with different wavelengths are transmitted through the same optical transmission line, it is assumed that there is a close relationship between the arithmetic operation of compensating for the dispersion of the optical signal A and the arithmetic operation of compensating for the dispersion of the optical signal B. Furthermore, it is assumed that the arithmetic operation of compensating for the nonlinear effect of the optical signal A is similar to the arithmetic operation of compensating for the nonlinear effect of the optical signal B. Thus, in the first embodiment, when the digital coherent receiver in an optical transmission device starts receiving an optical signal, the controller 23 of the digital coherent receiver acquires the value of the parameter of the waveform distortion corrector 22a which has been previously optimized in another digital coherent receiver.

The value of the parameter which has been previously optimized in each digital coherent receiver is stored in the parameter database 13 in the device controller 12 as described above. Therefore, the controller 23 may acquire the value of the parameter which has been previously optimized in another digital coherent receiver by accessing the device controller 12.

The controller 23 gives the filter coefficient corresponding to the value of the parameter acquired from the parameter database 13 as an initial value in the waveform distortion corrector 22a. Then, the controller 23 optimizes the filter coefficient given in the waveform distortion corrector 22a.

Thus, in the first embodiment, the filter coefficient close to the optimum value is provided for the waveform distortion corrector 22a as an initial value. Therefore, the time period up to the optimization of the operation state of the waveform distortion corrector 22a is short even without a training signal. Furthermore, the state in which the filter coefficient of the waveform distortion corrector 22a is not converged is avoided.

Figure 8:
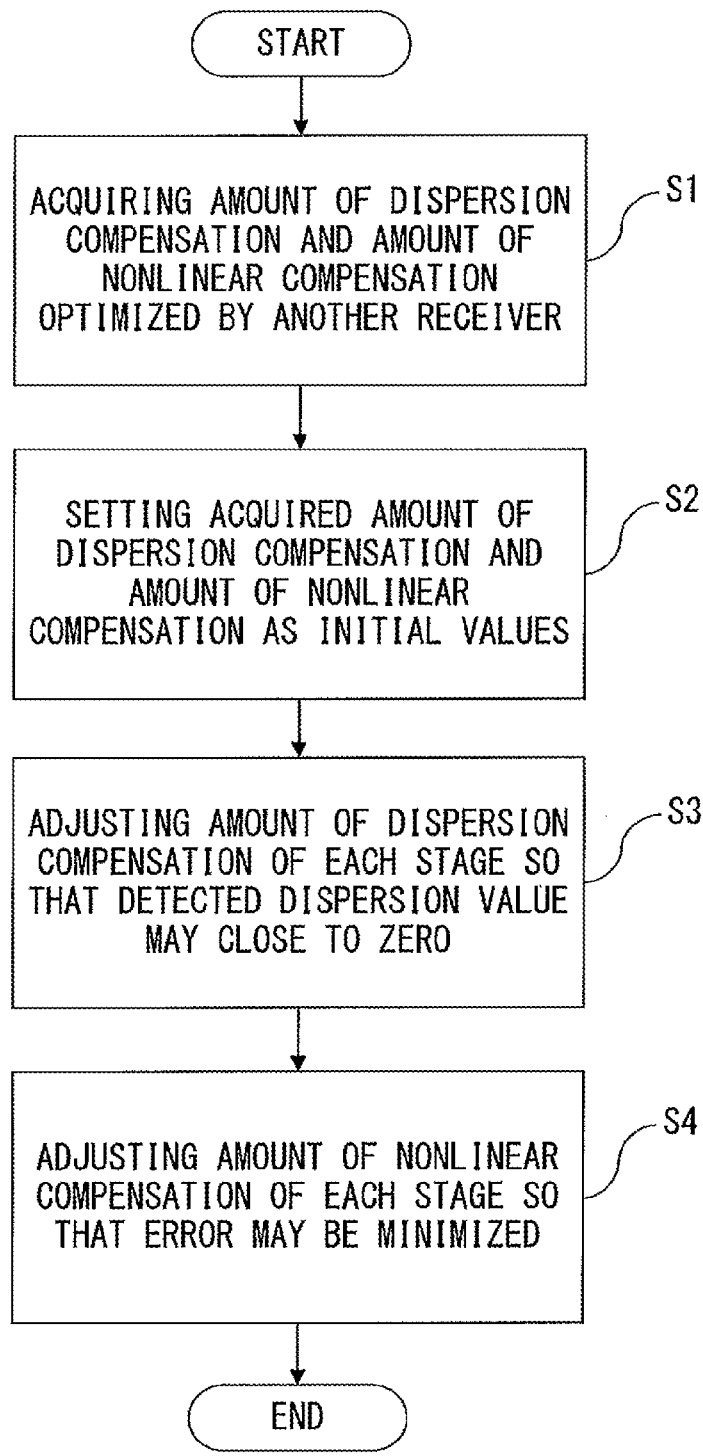
FIG. 8 is a flowchart of a process for adjusting a waveform distortion corrector according to a first embodiment of the present invention.

FIG. 8 is a flowchart of the process of adjusting the waveform distortion corrector 22a in the first embodiment. The process of the flowchart is performed when, for example, an instruction to receive an optical signal is issued from a network management system to an optical transmission device. The instruction includes the information indicating the transmission path of the optical signal (the information about the number of spans of the optical signal, and the source node of the optical signal).

In the following description, the digital coherent receiver 11 which starts to receive an optical signal may be referred to as a "target digital coherent receiver 11x", and an optical signal newly received by the target digital coherent receiver 11x may be referred to as a "target optical signal λx".

In S1, the controller 23 of the target digital coherent receiver 11x acquires the parameter previously optimized in another digital coherent receiver 11. For example, the controller 23 requests the device controller 12 to transmit the optimized parameter. The request includes the information for identifying the source node of the target optical signal λx. Then, the device controller 12 searches for an optical signal transmitted from the same source node as the target optical signal λx. The optical signal specified in the search may be hereafter referred to as a "reference optical signal λr". When there are a plurality of optical signals transmitted from the same source node as the target optical signal λx, any one of the signals is selected as a reference optical signal λr. Then, the device controller 12 extracts the parameter which has been optimized for the reference optical signal λr from the parameter database 13, and provides the parameter for the controller 23 of the target digital coherent receiver 11x. Otherwise, the device controller 12 may provide the target digital coherent receiver 11x with the parameter which has been optimized for the reference optical signal λr without a request from the target digital coherent receiver 11x.

The controller 23 of the target digital coherent receiver 11x acquires corresponding amount of dispersion compensation as the parameters for each of the dispersion compensators 31#1 through 31#N, and acquires corresponding amount of nonlinear compensation as the parameters for the nonlinear compensators 32#1 through 32#N (that is, γ and α). For example, when the source of the target optical signal λx is node N1, the optical signal λ1 is specified as the reference optical signal λr in the embodiment illustrated in FIG. 6. In this case, the controller 23 acquires "50 ps/nm", "−70 ps/nm", . . . , "20 ps/nm" respectively as the amounts of dispersion compensation for the dispersion compensators 31#1, 31#2, . . . , 31#N. In addition, the controller 23 acquires "0.3 and 0.05", "0.2 and 0.02", . . . , "0.3 and 0.04" respectively as the amounts of nonlinear compensation for the nonlinear compensators 32#1, 32#2, . . . , 32#N.

In S2, the controller 23 gives an initial value for the waveform distortion corrector 22a based on the parameter (amount of dispersion compensation and amount of nonlinear compensation) acquired from the device controller 12. In this case, the controller 23 may convert the acquired parameter into filter coefficients, and provide the filter coefficients for the corresponding digital filters (dispersion compensators 31#1 through 31#N, and the nonlinear compensators 32#1 through 32#N).

In S3, the controller 23 adjusts the amount of dispersion compensation (that is, the filter coefficient) of the dispersion compensators 31#1 through 31#N so that the chromatic dispersion detected by the dispersion monitor 22d may be close to zero. The initial value of the amount of dispersion compensation given to each of the dispersion compensators 31#1 through 31#N is the value for compensation of the dispersion of the reference optical signal λr. The target optical signal λx and the reference optical signal λr have different wavelengths and different amounts of dispersion. That is, when a filter coefficient which compensates for the dispersion of the reference optical signal λr is provided for the dispersion compensators 31#1 through 31#N, the dispersion of the target optical signal λx is not appropriately compensated.

The chromatic dispersion is substantially proportional with respect to the wavelength as illustrated in FIG. 7. Therefore, an amount of dispersion compensation for appropriately compensating for the dispersion of the target optical signal λx is obtained by collectively shifting the initial values given to the dispersion compensators 31#1 through 31#N (that is, the amount of dispersion compensation for compensation of the dispersion of the reference optical signal λr) by the same amount. For example, when the amounts of dispersion compensation "50 ps/nm", "−70 ps/nm", . . . , and "20 ps/nm" which have been optimized for the reference optical signal λr are acquired, the amounts of dispersion compensation for compensating for the dispersion of the target optical signal λx using the dispersion compensators 31#1 through 31#N are realized by "50 ps/nm+Δd", "−70 ps/nm+Δd", . . . , and "20 ps/nm+Δd".

Therefore, the controller 23 collectively adjusts by the same amount the amounts of dispersion compensation of the dispersion compensators 31#1 through 31#N so that the chromatic dispersion detected by the dispersion monitor 22d may be close to zero in S3. The controller 23 converts the calculated amount of dispersion compensation into a filter coefficient, and provides the result for the dispersion compensators 31#1 through 31#N. As a result, the waveform distortion corrector 22a is adjusted to the state in which the dispersion of the target optical signal λx is roughly compensated.

In S4, the controller 23 adjusts the filter coefficient of the nonlinear compensators 32#1 through 32#N so that the number of errors to be corrected (that is, the number of error corrections) by the FEC decoder 22c may be minimized. That is, the amount of nonlinear compensation of each stage is adjusted. In this case, the controller 23 adjusts the filter coefficient of the nonlinear compensators 32#1 through 32#N in the steepest descent method. Otherwise, the controller 23 may adjust the filter coefficient of the nonlinear compensators 32#1 through 32#N so that the number of corrected errors may be smaller than a specified threshold.

As described, in the first embodiment, the parameters previously optimized in another digital coherent receiver (amount of dispersion compensation and amount of nonlinear compensation) are given to the digital coherent receiver which newly starts to receive an optical signal. Since the chromatic dispersion is substantially proportional with respect to the wavelength, the amount of dispersion compensation of each stage of the waveform distortion corrector 22a of the target digital coherent receiver may be easily obtained from the amount of dispersion compensation previously optimized by another digital coherent receiver. Furthermore, since the power of the optical signals in the WDM optical signal are substantially equalized, the preferable amount of nonlinear compensation for each optical signal in the WDM optical signal is substantially the same. Therefore, when the parameter previously optimized in another digital coherent receiver is provided as an initial value, the adjustment of the filter coefficient is started from the value close to the optimum value in the digital coherent receiver which newly starts to receive an optical signal. Therefore, in a digital coherent receiver which newly starts to receive an optical signal, the adjustment of the operation state of the waveform distortion corrector 22a may be completed in a short time. Furthermore, since the adjustment of a filter coefficient is started from the value close to the optimum value, there is a small possibility that the state of the waveform distortion corrector 22a does not converge.

<Second Embodiment>

In the first embodiment, the controller 23 adjusts the filter coefficient of the nonlinear compensator 32 in each stage after collectively adjusting the dispersion compensator 31 in each stage. On the other hand, in the second embodiment, the controller 23 adjusts the filter coefficient of the dispersion compensator 31 of each stage and the filter coefficient of the nonlinear compensator 32 of each stage after collectively adjusting the dispersion compensator 31 of each stage.

Figure 9:
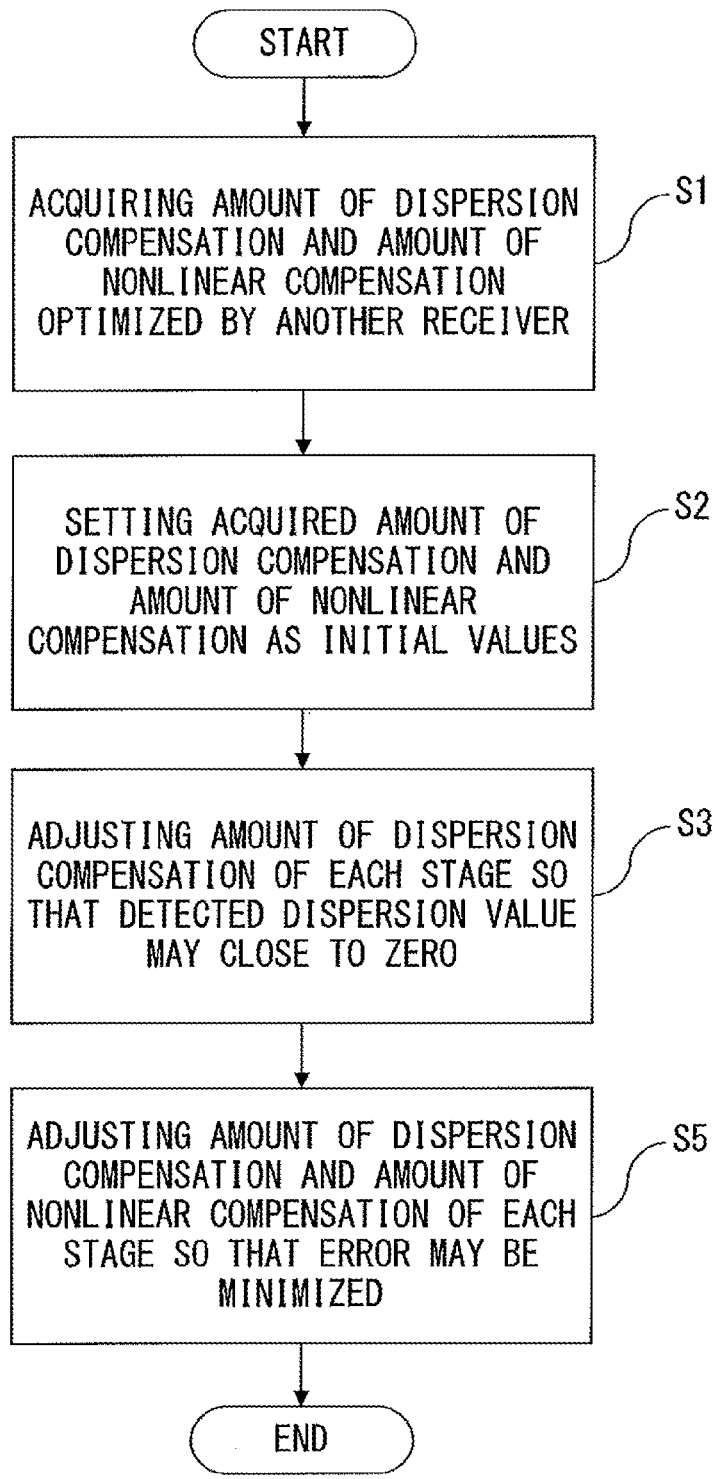
FIG. 9 is a flowchart of a process for adjusting a waveform distortion corrector according to a second embodiment of the present invention.

FIG. 9 is a flowchart of the process of adjusting the waveform distortion corrector 22a in the second embodiment. Since S1-S3 are substantially the same in the first and second embodiments, the descriptions are omitted here.

In S5, the controller 23 adjusts the filter coefficient of the dispersion compensators 31#1 through 31#N and the filter coefficient of the nonlinear compensators 32#1 through 32#N so that the number of error corrections counted by the FEC decoder 22c may be minimized. In this case, the nonlinear compensator 32 alternately repeats the process of adjusting the filter coefficient of the dispersion compensators 31#1 through 31#N, and the process of adjusting the filter coefficient of the nonlinear compensators 32#1 through 32#N. The process of adjusting each filter coefficient is repeatedly performed until, for example, the number of error corrections may be smaller than a specified threshold.

Thus, in the second embodiment, not only the filter coefficient of the nonlinear compensator 32 of each stage, but also the filter coefficient of the dispersion compensator 31 of each stage is finely adjusted. Therefore, as compared with the first embodiment, the second embodiment improves the accuracy of the correction of a waveform distortion.

<Third Embodiment>

Figure 10:
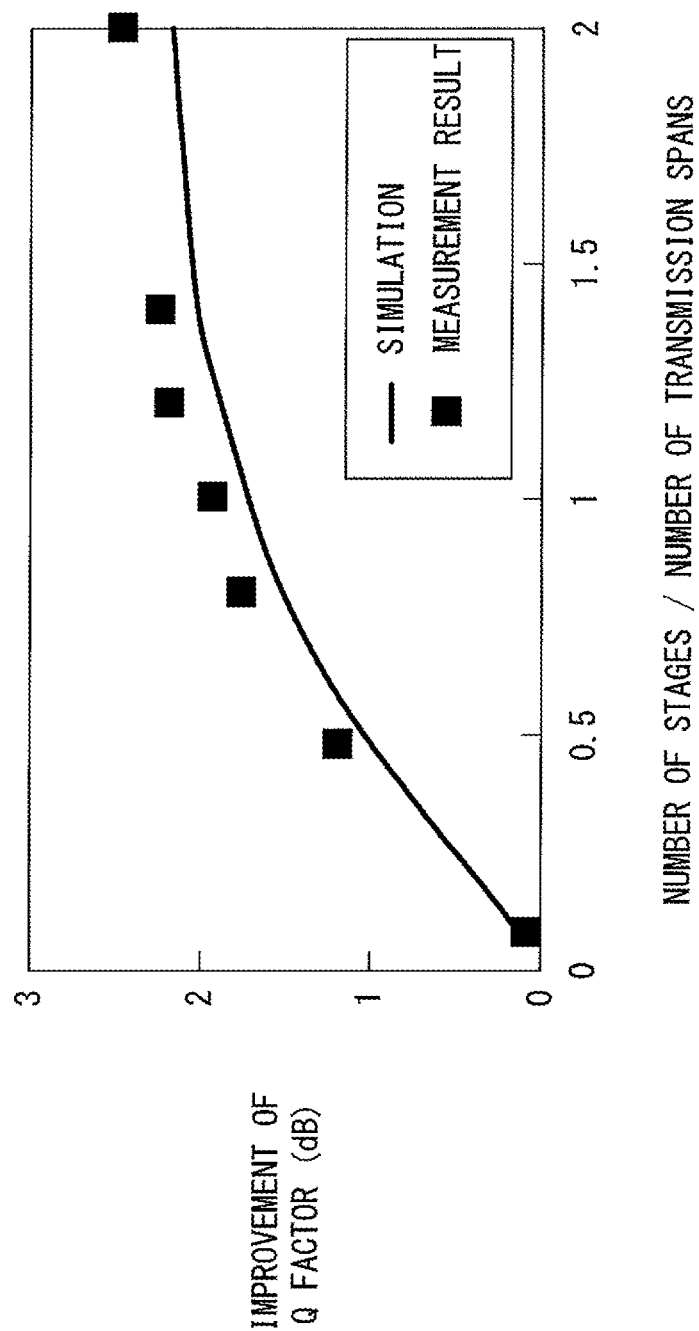
FIG. 10 illustrates the relationship between the number of stages of the waveform distortion corrector and the improvement of a Q factor.

In the waveform distortion corrector 22a having a plurality of dispersion compensators 31 and a plurality of nonlinear compensators 32, the accuracy of a waveform distortion correction may be enhanced by increasing the number of stages. The relationship between the number of stages and the improvement of a Q factor is described below with reference to FIG. 10. In FIG. 10, the horizontal axis indicates the ratio of the number of spans of the optical transmission line to the number of stages of the waveform distortion corrector 22a. That is, the horizontal axis indicates the number of stages normalized by the number of spans. The vertical axis indicates the amount of improvement of the Q factor.

As illustrated in FIG. 10, when the number of stages of the waveform distortion corrector 22a is smaller than the number of spans of the optical transmission line, the amount of improvement of the Q factor is small. That is, to improve the Q factor, it is preferable that the number of stages of the waveform distortion corrector 22a is larger than or equal to the number of spans. However, in the area where the number of stages is larger than the number of spans, the improvement effect of the Q factor is small. In the example illustrated in FIG. 10, the amount of improvement of the Q factor is about 0.5 dB when the ratio of the number of stages to the number of spans increases from 1 to 2.

In the third embodiment, in the digital coherent receiver which newly starts to receive an optical signal, the controller 23 adjusts the operation state of the number of the stages corresponding to the number of spans of the optical transmission line through which the optical signal is transmitted. That is, the operation state of the number of the dispersion compensators 31 corresponding to the number of spans and the number of nonlinear compensators 32 corresponding to the number of spans are adjusted in the dispersion compensators 31#1 through 31#N and the nonlinear compensators 32#1 through 32#N.

The "number corresponding to the number of spans" is equal to, for example, the number of spans. In this case, if the number of spans of the transmission line of an optical signal is 10, the operation state of ten dispersion compensators 31 and ten nonlinear compensators 32 are adjusted. However, the "number corresponding to the number of spans" may be a value a little larger than the number of spans, and also may be a value a little smaller than the number of spans. In the following descriptions, it is assumed that "the number corresponding to the number of spans equals to the number of spans".

Figure 11:
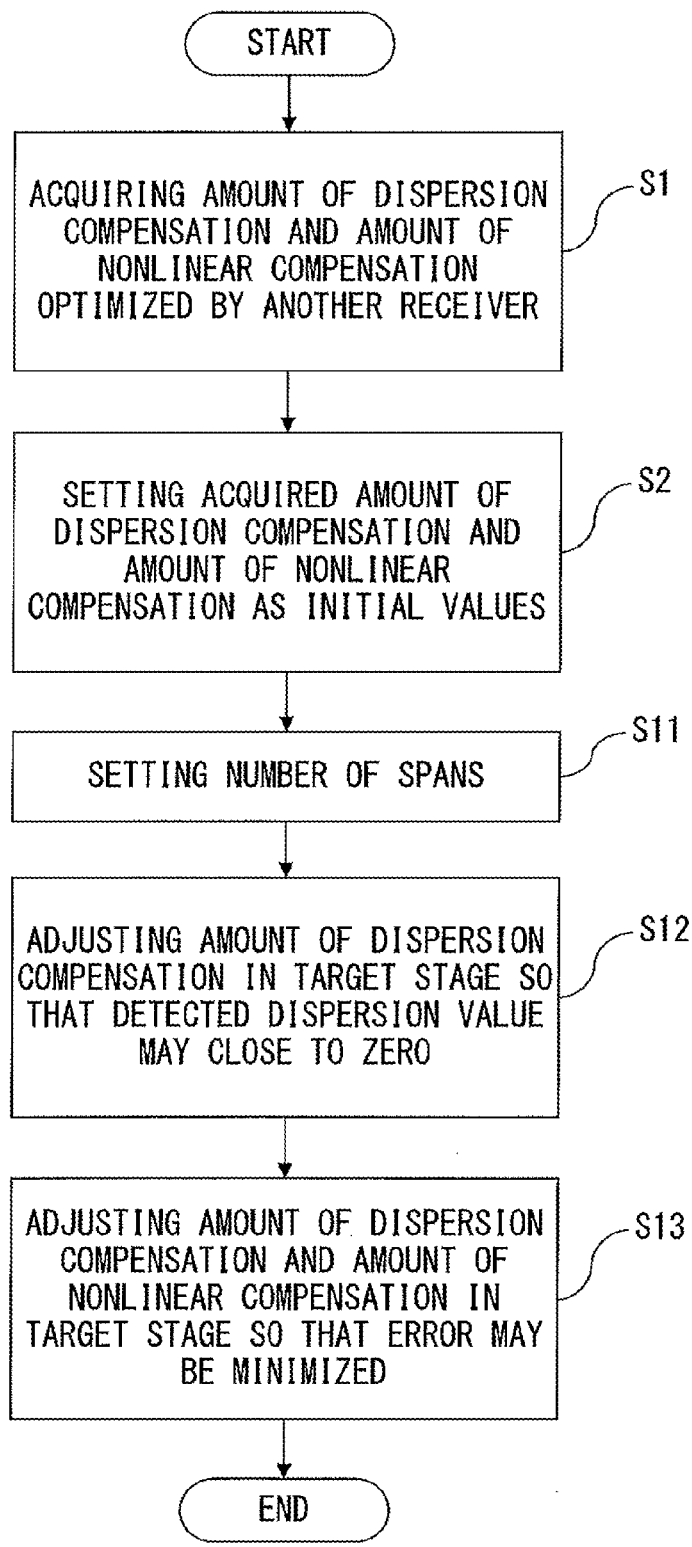
FIG. 11 is a flowchart of a process for adjusting a waveform distortion corrector according to a third embodiment of the present invention.

FIG. 11 is a flowchart of the process of adjusting the waveform distortion corrector 22a in the third embodiment. The meanings of the target digital coherent receiver 11x, the target optical signal λx, and the reference optical signal λr are the same in the first and third embodiments.

S1-S2 are substantially the same in the first and third embodiments. That is, the controller 23 acquires the parameters (the amount of dispersion compensation and the amount of nonlinear compensation for compensation of the waveform distortion of the reference optical signal λr) optimized in another digital coherent receiver. Then, the controller 23 gives the acquired parameters in the waveform distortion corrector 22a.

In S11, the controller 23 sets in the waveform distortion corrector 22a the number of spans of the optical transmission line through which the target optical signal λx is transmitted. The process of setting the number of spans in the waveform distortion corrector 22a is realized by specifying the same number of stages as the number of spans as the target stage. For example, when the number of spans is 10, the leading stages of the waveform distortion corrector 22a up to the tenth stage are specified as the target stages. In this case, the dispersion compensators 31#1 through 31#10 and the nonlinear compensators 32#1 through 32#10 are specified as an adjustment target (specified dispersion compensator and specified nonlinear compensator).

The transmission line information indicating the optical transmission line through which an optical signal is transmitted is notified to corresponding optical transmission device from the network management system when, for example, an optical path is setup. In this case, the transmission line information includes the information for identifying a start point node, a relay node, and an end point node. Then, the optical transmission device specifies a corresponding digital coherent receiver according to the received transmission line information. In this case, the transmission line information is fed to the specified digital coherent receiver. Therefore, the controller of the digital coherent receiver which newly starts to receive an optical signal recognizes the number of spans of the optical signal.

S12 corresponds to S3 of the first embodiment illustrated in FIG. 8. However, in S12, the controller 23 adjusts the amount of dispersion compensation (that is, the filter coefficient) only of the dispersion compensators 31 in the target stages so that the chromatic dispersion detected by the dispersion monitor 22d may be close to zero, Practically, the controller 23 collectively adjusts the amount of dispersion compensation of the dispersion compensators 31 in the target stages by the same amount so that the chromatic dispersion detected by the dispersion monitor 22d may be close to zero. The controller 23 converts the calculated amount of dispersion compensation into a filter coefficient and provides the conversion result for the dispersion compensators 31 in the target stages. In this case, the amount of dispersion compensation of the other dispersion compensator 31 (that is, the dispersion compensator 31 in a stage other than the target stages) is maintained as an initial value.

Figure 12:
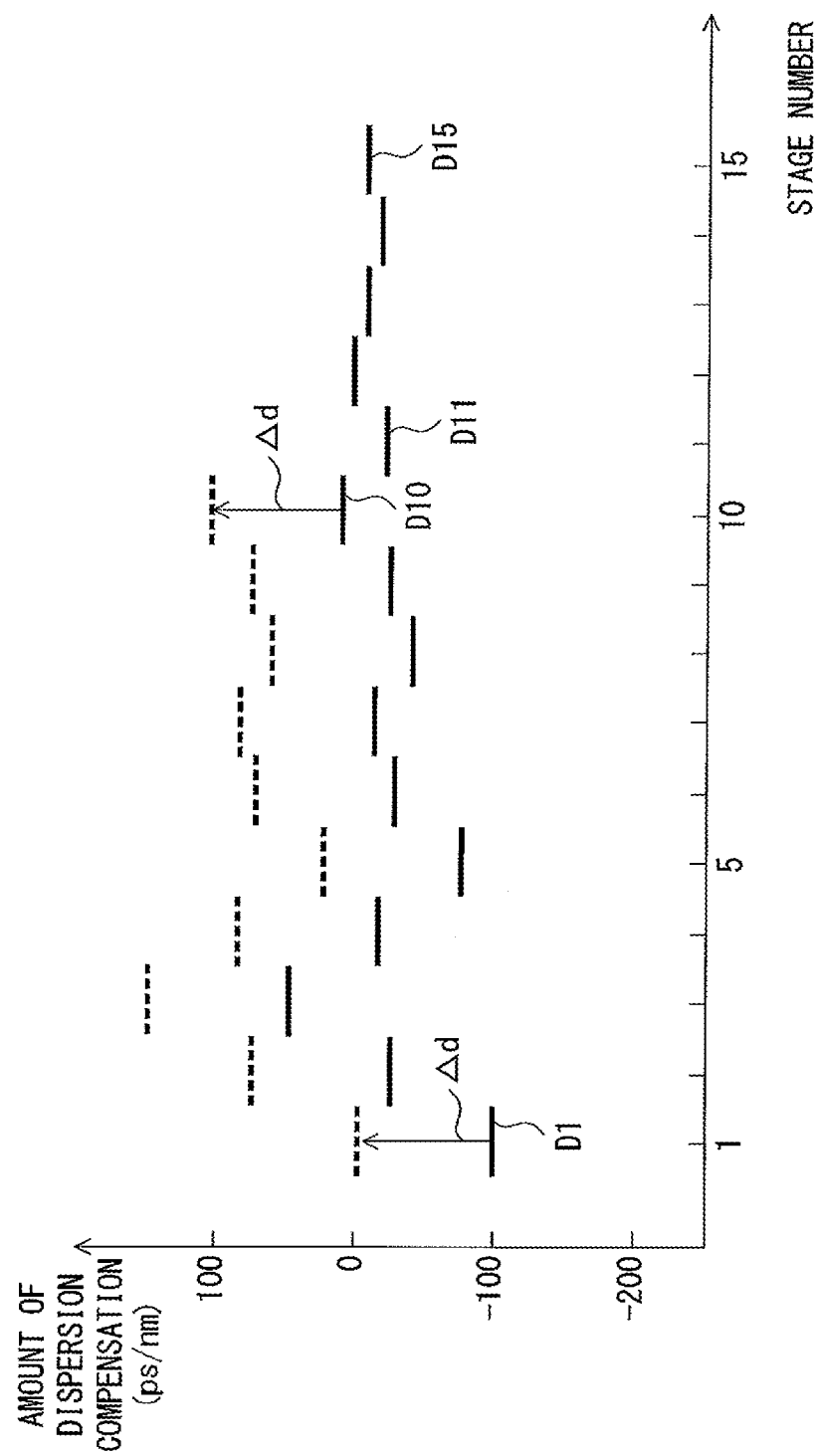
FIG. 12 illustrates an example of a process of adjusting an amount of dispersion compensation.

FIG. 12 illustrates an example of the process of adjusting the amount of dispersion compensation in S12. In the example, it is assumed that the waveform distortion corrector 22a in each digital coherent receiver includes 15 stages. D1 through D15 indicate the amounts of dispersion compensation of the corresponding dispersion compensators 31#1 and 31#15 which have been previously optimized in another digital coherent receiver. Therefore, in the dispersion compensators 31#1 through 31#15 of the target digital coherent receiver 11x, D1 through D15 (practically the filter coefficients corresponding to D1 through D15) are given as initial values in S2. Furthermore, it is assumed that the number of spans is 10.

In this case, the controller 23 in the target digital coherent receiver 11x collectively corrects the amounts of dispersion compensation D1 through D10 set in the dispersion compensators 31#1 through 31#10 based on the chromatic dispersion detected by the dispersion monitor 22d. In this example, when the detected chromatic dispersion is substantially zero, the amounts of dispersion compensation D1 through D10 are adjusted respectively to D1+Δd through D10+Δd. That is, the detected chromatic dispersion is corrected to substantially be zero by adjusting the amounts of dispersion compensation D1 through D10 to D1+Δd through D10+Δd. During this operation, the controller 23 does not adjust the amounts of dispersion compensation of the dispersion compensators 31#11 through 31#15. That is, the amounts of dispersion compensation D11 through D15 set in the dispersion compensators 31#11 through 31#15 remain unchanged.

S13 corresponds to S5 in the second embodiment illustrated in FIG. 9. However, in S13, the controller 23 adjusts the filter coefficient of the dispersion compensators 31 and the nonlinear compensators 32 only in the target stages so that the number of error corrections to be counted by the FEC decoder 22c may be minimized. That is, the amount of dispersion compensation and the amount of nonlinear compensation of each stage in the target stages are adjusted. In this case, the controller 23 adjusts the filter coefficient of the dispersion compensator 31 and the nonlinear compensator 32 in the target stages in, for example, the steepest descent method. Otherwise, the controller 23 may adjust the filter coefficient of the dispersion compensator 31 and the nonlinear compensator 32 only in the target stages so that the number of error corrections may be smaller than a specified threshold.

Thus, in the third embodiment, parameters of all stages are not adjusted, but parameters are adjusted in the stages corresponding to the number of transmitted spans in the waveform distortion corrector 22a. Therefore, in the third embodiment as compared with the first embodiment, the operation state of the waveform distortion corrector 22a may be adjusted in a further shorter time. When the number of stages in which parameters are adjusted is reduced, there is the possibility that the accuracy of the waveform distortion compensation becomes lower. However, as explained with reference to FIG. 10, when parameters are adjusted in the stages of substantially the same number as the number of spans of the optical signal, the degradation of the waveform distortion compensation accuracy is not severe.

There are various examples of the control method according to the third embodiment. For example, in the example illustrated in FIG. 11, the amount of dispersion compensation and the amount of nonlinear compensation are adjusted in S13, but the present invention is not limited to the method. For example, when there is a margin for dispersion tolerance, only an adjustment of an amount of nonlinear compensation may be performed in S13. Furthermore, although parameters acquired from another digital coherent receiver are set in all stages in the waveform distortion corrector 22a, the present invention is not limited to the method. For example, the dispersion compensator 31 and the nonlinear compensator 32 in a stage other than the target stages may be set to a state in which no operation is performed on an input signal.

When the process of the flowchart illustrated in FIG. 11 is completed, the waveform distortion corrector 22a is adjusted in the operation state in which the waveform distortion of an input optical signal may be sufficiently compensated. That is, when the above-mentioned adjusting process is completed, the digital coherent receiver may start serving a communication service. However, to further improve the waveform distortion compensation accuracy, the controller may continuously adjust the operation state of the dispersion compensator 31 and the nonlinear compensator 32 in a stage other than the target stages to minimize the number of error corrections. In this case, a waveform distortion may be appropriately compensated although, for example, the state of the optical transmission line is changed by a change of a temperature. Otherwise, when sufficiently good quality is acquired only by the adjustment illustrated in FIG. 11, a power supply to the dispersion compensator 31 and the nonlinear compensator 32 in a stage other than the target stages may be stopped. In this case, the power consumption of a digital coherent receiver is reduced.

<Fourth Embodiment>

In the first through third embodiments, the parameters optimized in each digital coherent receiver 11 are stored in the parameter database 13 of the device controller 12 as described above. Then, the digital coherent receiver 11 which newly starts to receive an optical signal acquires an optimized parameters for another digital coherent receiver from the device controller 12. On the other hand, in the fourth embodiment, parameters for the waveform distortion corrector 22a is transmitted between the digital coherent receivers.

Figure 13:
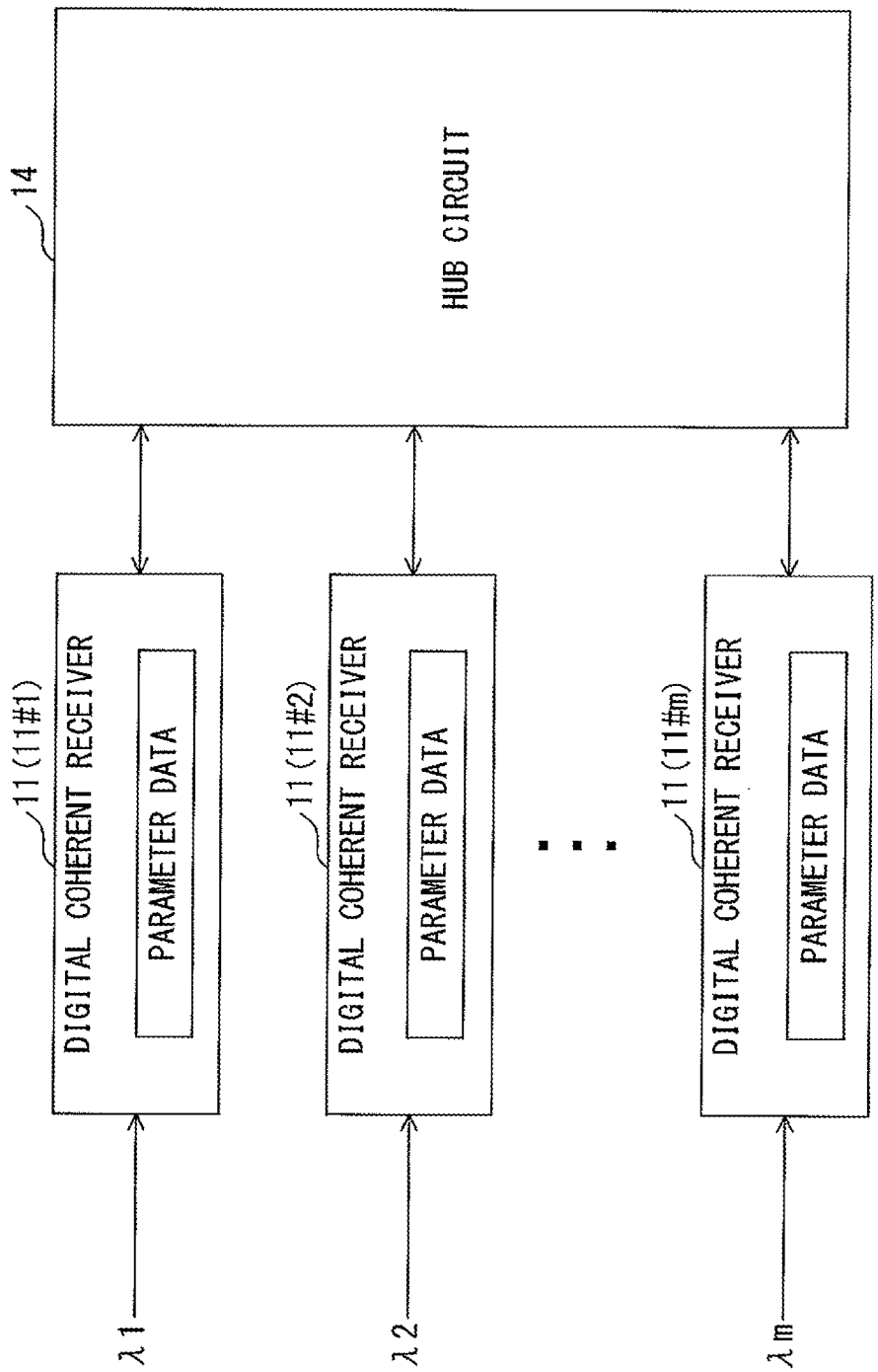
FIG. 13 illustrates an example of a receiver module used in a fourth embodiment of the present invention.

FIG. 13 illustrates an example of a receiver module used in an optical transmission device in the fourth embodiment. Each digital coherent receiver 11 may transmit data to another digital coherent receiver through the hub circuit 14. Furthermore, each digital coherent receiver 11 may receive data from another digital coherent receiver through the hub circuit 14.

The configuration of the digital coherent receiver 11 according to the fourth embodiment is substantially the same as the configurations according to the first through third embodiments illustrated in FIG. 4. Also in the fourth embodiment, the digital coherent receiver 11 optimizes parameters (amount of dispersion compensation and amount of nonlinear compensation) indicating the operation state of the waveform distortion corrector 22a. However, in the fourth embodiment, the controller 23 stores the optimized parameters in the memory implemented in the digital coherent receiver. That is, for example, the parameters optimized in the digital coherent receiver 11#1 are stored in the digital coherent receiver 11#1.

The digital coherent receiver 11 which newly starts to receive an optical signal (hereafter referred to as a target digital coherent receiver 11x) requests the parameters from the digital coherent receiver 11 which receives an optical signal from the same source as the target optical signal λx. The request includes, for example, information for identifying the source of the target optical signal λx. The digital coherent receiver 11 which has received the request transmits the requested parameters to the target digital coherent receiver 11x when receiving an optical signal from the same source as the target optical signal λx. Thus, the target digital coherent receiver 11x may acquire the parameters optimized in another digital coherent receiver 11 as with the first through third embodiments. Since the process of the controller 23 after acquiring the parameters is substantially the same as the process in the first through third embodiments, the explanation is omitted here.

When the adjustment of the waveform distortion corrector 22a is performed depending on the number of spans of the optical signal as in the third embodiment, for example, number-of-span information is set in advance in each digital coherent receiver 11. Then, the number-of-span information is communicated between the digital coherent receivers 11. The number-of-span information is given to each digital coherent receiver 11. Otherwise, the number-of-span information may be stored in the overhead of an optical signal. In this case, after the completion of the optimization of the parameters, the digital coherent receiver 11 extracts the number-of-span information from the overhead of an optical signal, and stores the information in the memory implemented in the digital coherent receiver 11.

<Fifth Embodiment>

The fifth embodiment is related to the operation performed when the optical path is switched by a fault etc. In the following explanation, as illustrated in FIG. 14A, an optical path through which the optical signal λ1 is transmitted from the node A to the node C through the node B is established. Also, an optical path through which the optical signal λ2 is transmitted from the node A to the node D through the node B is established. Anode device provided in each node includes a transmitter module illustrated in FIG. 2 and a receiver module illustrated in FIG. 3 to transmit a WDM optical signal.

In the node device D, a digital coherent receiver which receives the optical signal λ2 corrects the waveform distortion of the optical signal λ2 using the waveform distortion corrector 22a. Therefore, the node device D holds the parameters optimized for the optical signal λ2 (amount of dispersion compensation and amount of nonlinear compensation).

As illustrated in FIG. 14B, it is assumed that a fault occurs between the nodes B and C. After the occurrence of the fault, it is assumed that the destination of the data from the node A to the node C is changed to the node D. That is, the optical path is switched.

In this case, the network management system not illustrated in the attached drawings sets up an optical path through which the optical signal λ3 is transmitted from the node A to the node D through the node B. Then, the digital coherent receiver 11 which receives the optical signal λ3 adjusts the waveform distortion corrector 22a so that the waveform distortion of the optical signal λ3 may be compensated. The optical transmission lines of the optical signals λ2 and λ3 are the same. Therefore, the digital coherent receiver 11 which receives the optical signal λ3 acquires parameters previously optimized in the digital coherent receiver 11 which receives the optical signal λ2. Then, the digital coherent receiver 11 which receives the optical signal λ3 adjusts the operation state of the waveform distortion corrector 22a using the acquired parameters as initial values. Therefore, the time period taken from the occurrence of the switch of the optical paths to the completion of the adjustment of the waveform distortion corrector 22a is short, and the recovery time from the occurrence of a fault is short.

<Polarization Multiplexing>

The optical signal multiplexed on a WDM optical signal may be a polarization multiplexed optical signal. That is, the digital coherent receiver 11 may receive a polarization multiplexed optical signal.

A polarization multiplexed optical signal which propagates through an optical fiber is expressed by the following nonlinear Schroedinger's equation.

$$\frac{\partial E_x}{\partial z} = i(\gamma_1 |E_x|^2 + \gamma_2 |E_y|^2)E_x + \left(-i\frac{\beta_2}{2}\frac{\partial^2}{\partial t^2} - \frac{\alpha}{2}\right)E_x,$$

$$\frac{\partial E_y}{\partial z} = i(\gamma_1 |E_y|^2 + \gamma_2 |E_x|^2)E_y + \left(-i\frac{\beta_2}{2}\frac{\partial^2}{\partial t^2} - \frac{\alpha}{2}\right)E_y$$

$\alpha$ indicates a loss (or attenuation) in an optical fiber. $\beta_2$ indicates a chromatic dispersion coefficient. $\gamma_1$ and $\gamma_2$ indicate nonlinear coefficients of an optical fiber. When noise is ignored, a signal at a transmission end is calculated by inversely solving the nonlinear Schroedinger's equation from a reception end. Therefore, although a received optical signal is a polarization multiplexed optical signal, the waveform distortion corrector 22a includes a plurality of dispersion compensators 31 and a plurality of nonlinear compensators 32 as illustrated in FIG. 5.

Each dispersion compensator 31 performs an arithmetic operation of compensating for chromatic dispersion on each of H polarization and V polarization. In this case, the dispersion compensator 31 may compensate for the chromatic dispersion in the time domain, and may compensate for the chromatic dispersion in the frequency domain.

Figure 15:
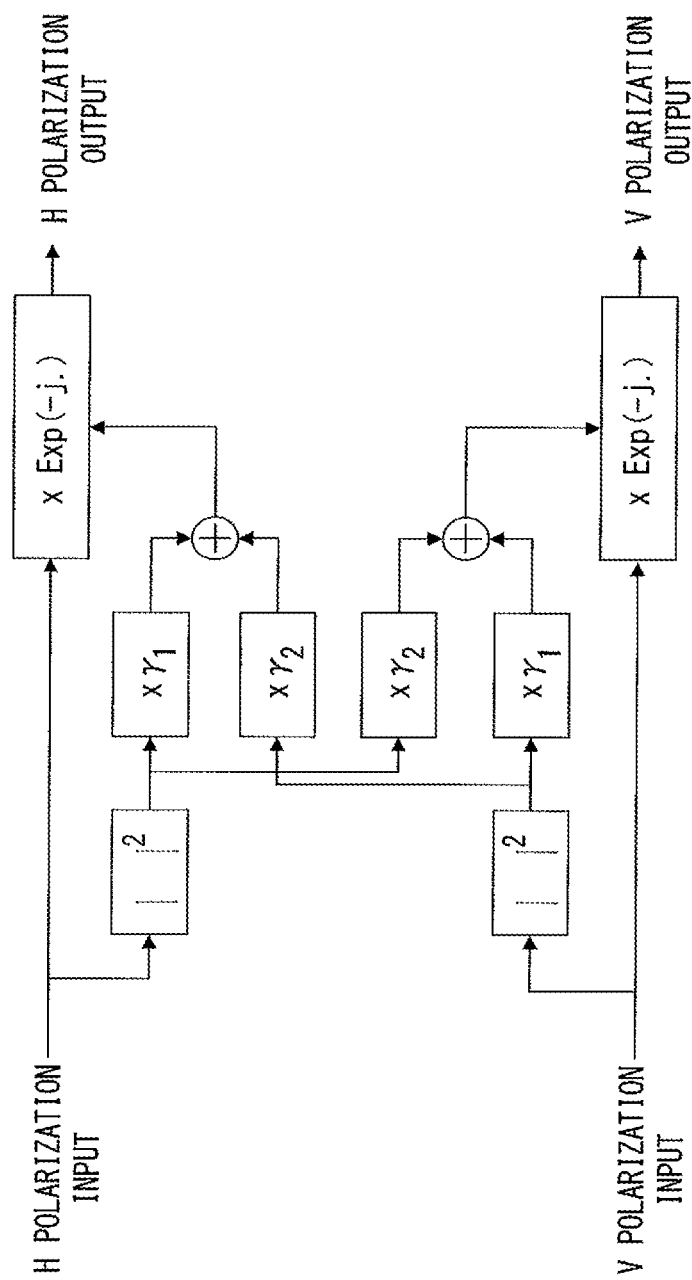
FIG. 15 illustrates an example of a configuration of a nonlinear compensator corresponding to a polarization multiplexed optical signal.

Each nonlinear compensator 32 provides a signal with a phase rotation proportional to optical signal power. Therefore, the nonlinear compensator 32 that compensates for nonlinear effect of a polarization multiplexed optical signal is realized by, for example, the configuration illustrated in FIG. 15.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A digital coherent receiver that receives a first optical signal in a wavelength division multiplexed optical signal in an optical transmission device that transmits the wavelength division multiplexed optical signal, the digital coherent receiver comprising:
   a front-end circuit configured to generate a digital signal indicating the first optical signal;
   a waveform distortion corrector configured to include a plurality of dispersion compensators and a plurality of nonlinear compensators and generate a correction result signal indicating a first optical signal whose waveform distortion has been corrected by performing a digital arithmetic operation on the digital signal using at least one of the plurality of dispersion compensators and at least one of the plurality of nonlinear compensators; and
   a controller configured to adjust operation states of specified dispersion compensators among the plurality of dispersion compensators and specified nonlinear compensators among the plurality of nonlinear compensators, wherein the number of the specified dispersion compensators and the number of the specified nonlinear compensators are determined based on the number of spans of an optical transmission line through which the first optical signal is transmitted, wherein
   the controller acquires parameters used for correcting waveform distortion of a second optical signal in the wavelength division multiplexed optical signal in another digital coherent receiver which receives the second optical signal in the optical transmission device, and gives the acquired parameters to the specified dispersion compensators and the specified nonlinear compensators.

2. The digital coherent receiver according to claim 1, wherein
   an optical transmission line of the second optical signal is the same as the optical transmission line of the first optical signal.

3. The digital coherent receiver according to claim 1, further comprising
   a dispersion monitor configured to detect residual dispersion according to the correction result signal output from the waveform distortion corrector, wherein
   the controller adjusts the parameter of the specified dispersion compensators so that the residual dispersion may be close to zero.

4. The digital coherent receiver according to claim 3, wherein
   the controller adjusts the parameter of the specified nonlinear compensators until the number of errors in the correction result signal becomes smaller than a specified threshold after adjusting the parameter of the specified dispersion compensators.

5. The digital coherent receiver according to claim 1, further comprising
   a dispersion monitor configured to detect residual dispersion according to the correction result signal output from the waveform distortion corrector, wherein
   the controller adjusts the parameter of the specified dispersion compensators so that the residual dispersion may be close to zero, and then alternately performs a process of adjusting the parameter of the specified dispersion compensators and a process of adjusting the parameter of the specified nonlinear compensators until the number of errors in the correction result signal becomes smaller than a specified threshold.

6. The digital coherent receiver according to claim 1, wherein
   the controller stops supplying power to a dispersion compensator other than the specified dispersion compensators and a nonlinear compensator other than the specified nonlinear compensators.

7. A receiving method for receiving a first optical signal in a wavelength division multiplexed optical signal by using a first digital coherent receiver in an optical transmission device which transmits the wavelength division multiplexed optical signal, the optical transmission device including the first digital coherent receiver and a second digital coherent receiver which receives a second optical signal in the wavelength division multiplexed optical signal, the receiving method comprising:
   acquiring parameters used for correcting waveform distortion of the second optical signal in the second digital coherent receiver;
   generating a digital signal indicating the first optical signal in the first digital coherent receiver;
   generating a correction result signal indicating an optical signal whose waveform distortion has been corrected by performing a digital arithmetic operation on the digital signal using a waveform distortion correction circuit including a plurality of dispersion compensators and a plurality of nonlinear compensators in the first digital coherent receiver;
   adjusting operation states of the plurality of dispersion compensators and the plurality of nonlinear compensators in the first digital coherent receiver; and
   recovering data from the correction result signal in the first digital coherent receiver, wherein
   the acquired parameters are given to the plurality of dispersion compensators and the plurality of nonlinear compensators as initial parameters.

8. An optical transmission device comprising: a plurality of digital coherent receivers configured to receive respective optical signals multiplexed in a wavelength division multiplexed optical signal, wherein
   each digital coherent receiver includes:

a front-end circuit configured to generate a digital signal indicating a corresponding received optical signal;

a waveform distortion corrector configured to include a plurality of dispersion compensators and a plurality of nonlinear compensators and generate a correction result signal indicating the corresponding received optical signal whose waveform distortion has been corrected by performing a digital arithmetic operation on the digital signal using at least one of the plurality of dispersion compensators and at least one of the plurality of nonlinear compensators;

a data recovery unit configured to recover data from the correction result signal; and a controller configured to adjust a parameter used by the plurality of dispersion compensators and the plurality of nonlinear compensators in a digital arithmetic operation of generating the correction result signal, wherein when a first digital coherent receiver starts to receive a first optical signal in the wavelength division multiplexed optical signal, the parameter which has been adjusted by the controller in a second digital coherent receiver that receives a second optical signal in the wavelength division multiplexed optical signal is given to the waveform distortion corrector of the first digital coherent receiver.

9. The optical transmission device according to claim 8, further comprising a storage unit configured to store a parameter which has been adjusted by a controller for a corresponding digital coherent receiver for corresponding optical signal in the wavelength division multiplexed optical signal, wherein the controller of the first digital coherent receiver acquires the parameter adjusted for the second optical signal from the storage unit.

10. The optical transmission device according to claim 8, wherein each of the digital coherent receivers includes a storage unit which stores a parameter adjusted by the controller, and a controller of the first digital coherent receiver acquires the parameter adjusted for the second optical signal from the storage unit of the second digital coherent receiver.

11. The optical transmission device according to claim 8, wherein an optical transmission line of the second optical signal is the same as an optical transmission line of the first optical signal.

12. A digital coherent receiver that receives a first optical signal in a wavelength division multiplexed optical signal in an optical transmission device that transmits the wavelength division multiplexed optical signal, the digital coherent receiver comprising:

a front-end circuit configured to generate a digital signal indicating the first optical signal;

a waveform distortion corrector configured to include a plurality of dispersion compensators and a plurality of nonlinear compensators and generate a correction result signal indicating a first optical signal whose waveform distortion has been corrected by performing a digital arithmetic operation on the digital signal using at least one of the plurality of dispersion compensators and at least one of the plurality of nonlinear compensators; and a controller configured to acquire parameters used for correcting waveform distortion of a second optical signal in the wavelength division multiplexed optical signal in another digital coherent receiver which receives the second optical signal in the optical transmission device, give the acquired parameters to the plurality of dispersion compensators and the plurality of nonlinear compensators, and adjust operation states of the plurality of dispersion compensators and the plurality of nonlinear compensators.

\* \* \* \* \*